United States Patent
Kuroda et al.

(10) Patent No.: US 9,906,089 B2
(45) Date of Patent: Feb. 27, 2018

(54) ROTATING ELECTRIC MACHINE

(71) Applicant: Mitsubishi Electric Corporation, Chiyoda-ku, Tokyo (JP)

(72) Inventors: Motokazu Kuroda, Chiyoda-ku (JP); Masaki Hinoue, Chiyoda-ku (JP)

(73) Assignee: Mitsubishi Electric Corporation, Chiyoda-ku, Tokyo (JP)

( * ) Notice: Subject to any disclaimer, the term of this patent is extended or adjusted under 35 U.S.C. 154(b) by 602 days.

(21) Appl. No.: 14/507,906

(22) Filed: Oct. 7, 2014

(65) Prior Publication Data
US 2015/0333594 A1   Nov. 19, 2015

(30) Foreign Application Priority Data
May 16, 2014   (JP) ................. 2014-102398

(51) Int. Cl.
*H02K 5/22*       (2006.01)
*H02K 11/04*      (2016.01)
(Continued)

(52) U.S. Cl.
CPC .............. *H02K 5/18* (2013.01); *H02K 5/225* (2013.01); *H02K 11/046* (2013.01); *H02K 9/22* (2013.01)

(58) Field of Classification Search
CPC . H02K 11/05; H02K 5/04; H02K 5/18; H02K 5/225; H02K 9/22; H02K 11/04; H02K 11/46; H02K 11/48–11/49
See application file for complete search history.

(56) References Cited

U.S. PATENT DOCUMENTS

| | | | | |
|---|---|---|---|---|
| 6,160,332 A | * | 12/2000 | Tsuruhara | H02K 5/20 310/54 |
| 7,009,316 B2 | * | 3/2006 | Ueda | H02K 3/50 310/43 |

(Continued)

FOREIGN PATENT DOCUMENTS

| | | |
|---|---|---|
| JP | 2005-012936 A | 1/2005 |
| JP | 2006-208555 A | 8/2006 |

(Continued)

OTHER PUBLICATIONS

Japanese Office Action, Application No. 2014-102398, dated Feb. 10, 2015.

*Primary Examiner* — Quyen Leung
*Assistant Examiner* — Eric Johnson
(74) *Attorney, Agent, or Firm* — Sughrue Mion, PLLC; Richard C. Turner (57) ABSTRACT

Provided is a rotating electric machine capable of suppressing an increase in temperature of an output terminal (26) to suppress a temperature rise of an internal device, and preventing lowering of a force for fastening the output terminal and a terminal portion of an external device. The rotating electric machine for a vehicle includes a rectifier provided inside a casing, and a terminal device projecting outward through an opening portion of the casing to connect the internal device and the external device. The terminal device includes the output terminal (26) projecting outward through the opening portion to be connected to the terminal portion of the external device by fastening, and a resin body (37) having electrical insulating property and high thermal conductivity, for integrally covering the output terminal (26) except at least for a portion to be connected to a harness-side terminal (35).

12 Claims, 4 Drawing Sheets

(51) Int. Cl.
   *H02K 5/18*      (2006.01)
   *H02K 9/22*      (2006.01)

(56) References Cited

U.S. PATENT DOCUMENTS

| | | | | |
|---|---|---|---|---|
| 7,429,810 | B2* | 9/2008 | Ueda | H02K 3/50 |
| | | | | 310/43 |
| 2003/0222515 | A1* | 12/2003 | Ueda | H02K 3/50 |
| | | | | 310/43 |
| 2006/0138876 | A1* | 6/2006 | Ueda | H02K 3/50 |
| | | | | 310/43 |
| 2006/0273671 | A1* | 12/2006 | Oohashi | H02K 11/046 |
| | | | | 310/68 D |
| 2007/0024299 | A1* | 2/2007 | Itakura | H01L 21/67109 |
| | | | | 324/750.08 |

FOREIGN PATENT DOCUMENTS

| | | |
|---|---|---|
| JP | 2006-340516 A | 12/2006 |
| JP | 2011-24451 2 A | 12/2011 |
| JP | 2013-126287 A | 6/2013 |

\* cited by examiner

ROTATING ELECTRIC MACHINE

BACKGROUND OF THE INVENTION

1. Field of the Invention

The present invention relates to a rotating electric machine including a terminal device for electrically connecting an external device provided outside a casing to an internal device provided inside the casing.

2. Description of the Related Art

In a related-art AC generator for a vehicle, an output terminal projects in a radial direction of a rear bracket. A terminal electrically connected to a harness on a vehicle side is inserted into the output terminal and is securely fastened by a nut. In this manner, power of the AC generator for a vehicle is output to a device on the vehicle side.

In recent years, as an output of the AC generator for a vehicle, a high output equal to or higher than 200 A is required. Therefore, such a high current flows through the output terminal. The output terminal is generally firmly fixed integrally with an insulating bush made of a resin and is mounted to a heat sink of a rectifier or the like (see, for example, Japanese Patent No. 3974560).

The related-art AC generator described above has a problem in that the output terminal generates heat by a flow of the high current to cause a rise in temperature of semiconductor elements such as diodes constituting the rectifier provided in proximity to the output terminal.

Moreover, there is another problem. Specifically, the heat generation of the output terminal leads to thermal deterioration and thermal contraction of the insulating bush made of a resin. As a result, the fastened nut is loosened to lower a force applied by the nut for fastening the harness-side terminal to the output terminal.

SUMMARY OF THE INVENTION

The present invention has been made to solve the problems described above, and therefore has an object to provide a rotating electric machine capable of suppressing an increase in temperature of an output terminal to suppress a temperature rise of an internal device provided inside a casing, and preventing lowering of a force for fastening the output terminal and a terminal portion of an external device to each other.

According to one embodiment of the present invention, there is provided a rotating electric machine, including:
  a casing having an opening portion;
  an internal device provided inside the casing; and
  a terminal device provided so as to project outward from inside of the casing through the opening portion, the terminal device being configured to electrically connect the internal device and an external device provided outside the casing,
in which the terminal device includes:
    an output terminal projecting outward through the opening portion to be connected to a terminal portion of the external device by fastening; and
    a resin body having electrical insulating property and high thermal conductivity, for integrally covering the output terminal except at least for a portion to be connected to the terminal portion.

Further, according to another embodiment of the present invention, there is provided a rotating electric machine, including:
  a casing having an opening portion;
  an internal device provided inside the casing; and
  a terminal device provided so as to project outward from inside of the casing through the opening portion, the terminal device being configured to electrically connect the internal device and an external device provided outside the casing,
in which the terminal device includes:
    an output terminal projecting outward through the opening portion to be connected to a terminal portion of the external device by fastening;
    a cylindrical body having electrical insulating property and high thermal conductivity, the cylindrical body including:
      a joint portion joined to an outer circumferential portion of a part of the output terminal, the part being connected to the internal device;
      a base portion extending from the joint portion in a radial direction of the cylindrical body; and
      an extended portion having a larger diameter than a diameter of the joint portion and extending from the base portion in an axial direction of the cylindrical body so as to surround the output terminal;
    a heat sink jointed to an outer circumferential portion of the extended portion of the cylindrical body; and
    a resin body having electrical insulating property and high thermal conductivity, the resin body being provided so as to surround the output terminal, the resin body integrating the output terminal, the cylindrical body, and the heat sink with each other.

According to the rotating electric machine of one embodiment of the present invention, the output terminal is covered integrally with the resin body having the electrical insulating property and the high thermal conductivity except at least for the portion to be connected to the terminal portion. Therefore, with a simple configuration, an increase in temperature of the output terminal can be suppressed to suppress a temperature rise of the internal device provided inside the casing. Further, the force for fastening the output terminal and the terminal portion of the external device to each other can be prevented from being lowered.

Further, according to the rotating electric machine of another embodiment of the present invention, the resin body having the electrical insulating property and the high thermal conductivity is provided so as to surround the output terminal. In addition, the output terminal, the cylindrical body, and the heat sink are integrated with each other by using the resin body. Thus, the increase in temperature of the output terminal can be further suppressed. As a result, the temperature rise of the internal device provided inside the casing can be suppressed. Further, the force for fastening the output terminal and the terminal portion of the external device to each other can be prevented from being lowered.

DETAILED DESCRIPTION OF THE PREFERRED EMBODIMENTS

Now, embodiments of the present invention are described referring to the accompanying drawings. In the drawings, the same or corresponding members and parts are denoted by the same reference symbols.

First Embodiment

Figure 1:
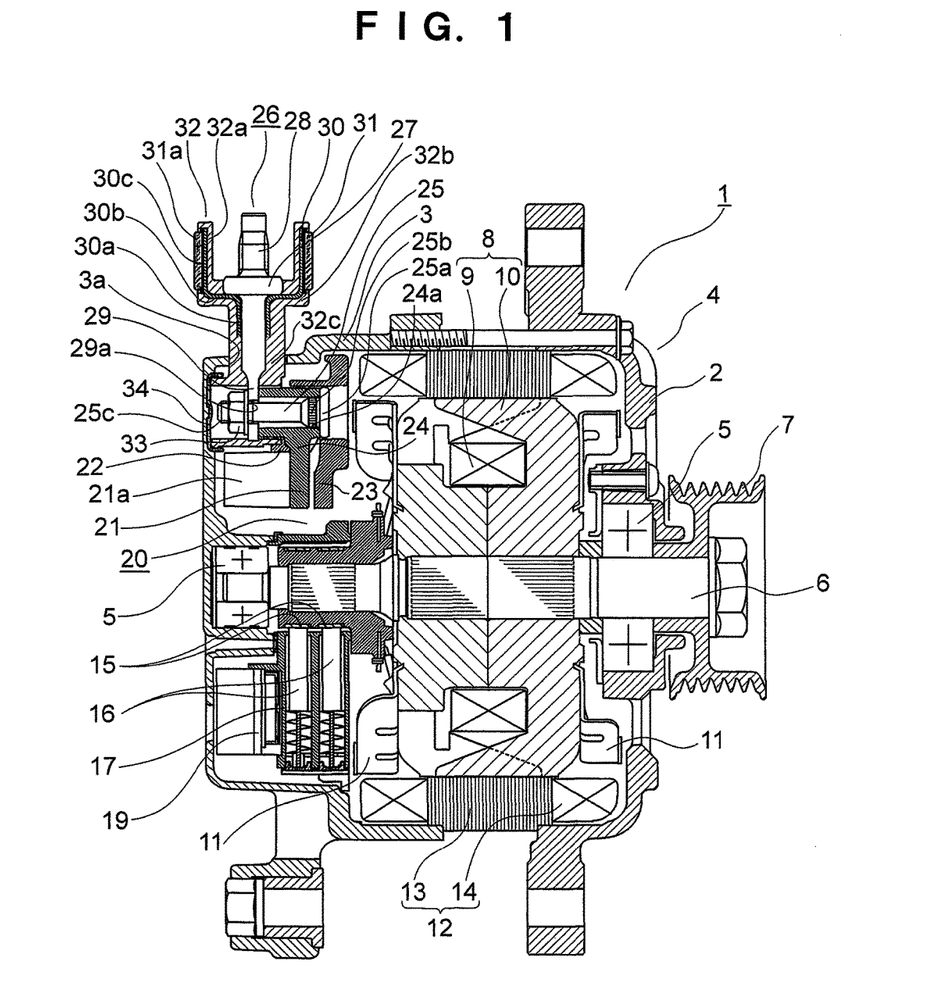
FIG. 1 is a vertical sectional view illustrating an AC generator for a vehicle according to a first embodiment of the present invention.
Figure 2:
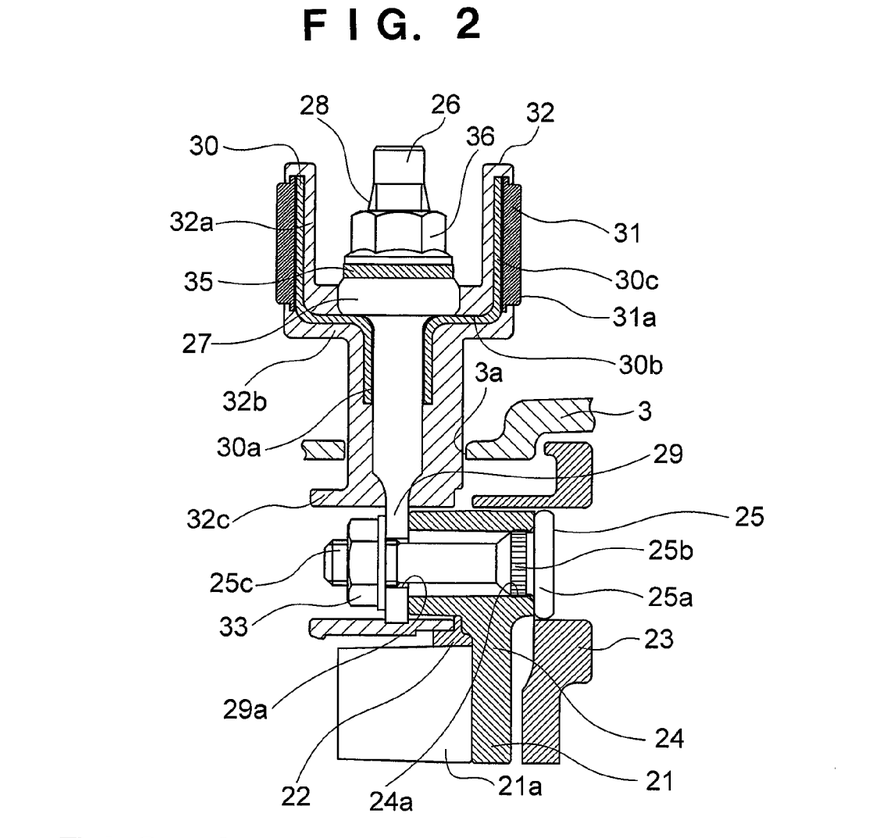
FIG. 2 is an enlarged sectional view of a main part of FIG. 1.
Figure 3:
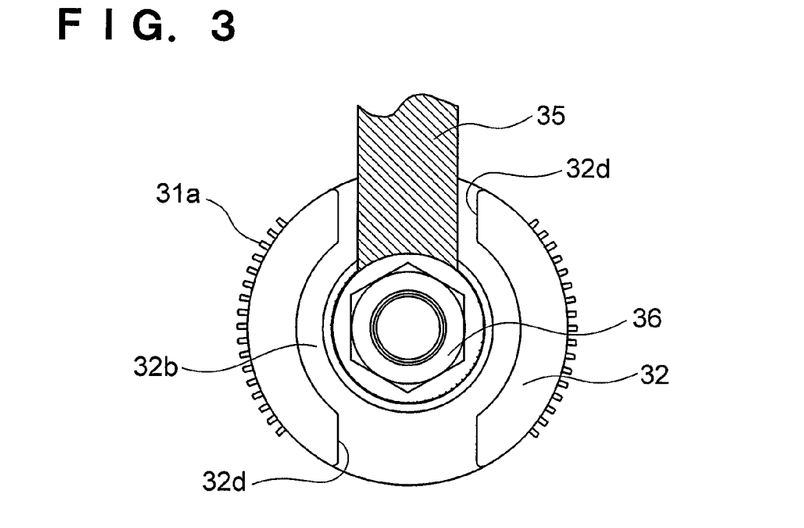
FIG. 3 is a plan view of FIG. 2.

FIG. 1 is a vertical sectional view illustrating an AC generator for a vehicle according to a first embodiment of the present invention, FIG. 2 is an enlarged sectional view of a main part of FIG. 1, and FIG. 3 is a plan view of FIG. 2.

An AC generator 1 for a vehicle, which is a rotating electric machine, includes a casing 4, a shaft 6, a pulley 7, a rotor 8, a pair of fans 11, and a stator 12. The casing 4 includes a front bracket 2 and a rear bracket 3, each being made of aluminum to have an approximately bowl-like shape. The shaft 6 is rotatably supported by the casing 4 through a pair of bearings 5. The pulley 7 is firmly fixed to an axial end portion of the shaft 6, which extends to a front side of the casing 4. The rotor 8 is fixed to the shaft 6 and is provided in the casing 4. The fans 11 are respectively fixed to both axial end surfaces of the rotor 8. The stator 12 is fixed to the casing 4 so as to surround the rotor 8.

The AC generator 1 for a vehicle further includes a pair of slip rings 15, a pair of brushes 16, a brush holder 17, a voltage regulator 19, and a rectifier 20. The slip rings 15 for supplying a current to the rotor 8 are each fixed to a portion of the shaft 6, which is extended to a rear side of the casing 4. The brushes 16 come into sliding contact with surfaces of the respective slip rings 15. The brush holder 17 receives the pair of brushes 16 therein. The voltage regulator 19 is mounted to a surface of the brush holder 17, which is located on the rear bracket 3 side, and regulates a magnitude of an AC voltage generated in stator windings 14 described below, which are provided to the stator 12. The rectifier 20 is provided in a rear-side space inside the rear bracket 3 and converts an AC electromotive force generated in the stator 12 into a DC output voltage.

The rotor 8 is a Lundell-type rotor. The rotor 8 includes field windings 9 and pole cores 10. An exciting current flows through the field windings 9 to generate magnetic fluxes. The pole cores 10 are provided so as to cover the field windings 9. Magnetic poles are formed in the pole cores 10 by the magnetic fluxes generated by the field windings 9.

The stator 12 includes a stator core 13 having a cylindrical shape and the stator windings 14. The stator windings 14 are wound around the stator core 13 and induce the AC electromotive force by a change in magnetic flux from the field windings 9 along with the rotation of the rotor 8.

The stator core 13 of the stator 12, which is provided so as to surround the rotor 8, is provided between an open end of the front bracket 2 and an open end of the rear bracket 3. The stator core 13 is interposed between the front bracket 2 and the rear bracket 3 by fastening the front bracket 2 and the rear bracket 3 provided on both axial ends of the stator core 13 with a plurality of bolts.

The rectifier 20 includes a positive-pole side heat sink 21, a negative-pole side heat sink 22, and a circuit board 23. The positive-pole side heat sink 21 has an approximately C-like shape as viewed from an axial direction of the shaft 6. A plurality of positive-pole side fins 21*a*, which extend outward in the axial direction of the shaft 6, are provided on one surface of the positive-pole side heat sink 21, whereas a plurality of positive-pole side rectifier elements (not shown) are mounted on another surface of the positive-pole side heat sink 21. The negative-pole side heat sink 22 has an approximately C-like shape as viewed from the axial direction of the shaft 6 and is provided so as to overlap the positive-pole side heat sink 21 in the axial direction of the shaft 6. On the negative-pole side heat sink 22, a plurality of negative-pole side rectifier elements (not shown) are mounted. The circuit board 23 has an approximately C-like shape as viewed from the axial direction of the shaft 6 and retains the positive-pole side heat sink 21 and the negative-pole side heat sink 22.

For the positive-pole side heat sink 21 and the negative-pole side heat sink 22, a material having high thermal conductivity such as aluminum is used. For the circuit board 23, a resin such as polyphenylene sulfide is used.

The positive-pole side heat sink 21, the negative-pole side heat sink 22, and the circuit board 23 are fastened to the rear bracket 3 by a mount screw (not shown).

Next, a terminal device of the AC generator 1 for a vehicle is described referring to FIGS. 2 and 3.

The terminal device includes an output terminal 26, a cylindrical body 30, a heat sink 31, and a resin body 32. The cylindrical body 30 has an end portion joined to the output terminal 26. The heat sink 31 is joined onto an outer circumferential portion of the cylindrical body 30. The resin body 32 has electrical insulating property and high thermal conductivity. The resin body 32 surrounds the output terminal 26 and integrates the output terminal 26, the cylindrical body 30, and the heat sink 31 with each other.

The terminal device is mounted to a relay terminal bolt 25 provided inside the rear bracket 3.

The relay terminal bolt 25 is made of an electrically conductive material such as iron. The relay terminal bolt 25 includes a head portion 25*a* and an output-terminal mounting male screw 25*c*. The head portion 25*a* has a knurled portion 25*b*, which is formed by knurling a bottom portion (small-diameter portion) of the head portion 25*a*. The relay terminal bolt 25 is mounted to one of flange portions 24 provided on both ends of the positive-pole side heat sink 21 by press-fitting the knurled portion 25*b* into a through hole 24*a* formed through the one flange portion 24.

The output terminal 26 of the terminal device is made of an electrically conductive material such as iron. The output terminal 26 includes a coupling seat 27, a harness-side terminal mounting male screw portion 28, and a mounting portion 29. The harness-side terminal mounting male screw portion 28 is provided on one side of the coupling seat 27 so as to be extended therefrom. The mounting portion 29 is provided on another side of the coupling seat 27 so as to be extended therefrom. A through hole 29*a* is formed through a distal end portion of the mounting portion 29.

The output terminal 26 is securely fastened to the one flange portion 24 of the positive-pole side heat sink 21 by inserting the output-terminal mounting male screw 25*c* into the through hole 29*a* and then screwing an output-terminal mounting nut 33 onto the output-terminal mounting male screw 25*c*.

The cylindrical body 30 includes a joint portion 30*a*, a base portion 30*b*, and an extended portion 30*c*. The joint portion 30*a* has a cylindrical shape and extends inward from the coupling seat 27 of the output terminal 26 in a radial direction of the shaft 6 to be joined to the output terminal 26. The base portion 30*b* extends from the joint portion 30*a* in a radial direction of the cylindrical body 30. The extended portion 30c having a larger diameter than that of the joint portion 30a extends from the base portion 30b in an axial direction of the cylindrical body 30. The cylindrical body 30 is made of a ceramic having electrical insulating property and high thermal conductivity.

The heat sink 31 made of aluminum is mounted integrally to an outer circumferential portion of the extended portion 30c of the cylindrical body 30. The heat sink 31 includes a plurality of, for example, thirty-four cooling fins 31a, which are provided equiangularly to the heat sink 31.

The resin body 32 includes a terminal portion 32a, a base portion 32b, and a mounting portion 32c. The terminal portion 32a is integral with the extended portion 30c of the cylindrical body 30 and is separated away from the output terminal 26. The base portion 32b is integral with the base portion 30b of the cylindrical body 30. The mounting portion 32c is integral with the joint portion 30a of the cylindrical body 30. The resin body 32 integrates the output terminal 26, the cylindrical body 30, and the heat sink 31 by insert molding.

In the manner described above, the terminal device including the output terminal 26, the cylindrical body 30, the heat sink 31, and the resin body 32 is constructed as a single component.

In this embodiment, the resin body 32 is made of a thermoplastic polyphenylene sulfide (PPS) resin.

An opening portion of the mounting portion 32c of the resin body 32 is closed by a cap 34 as illustrated in FIG. 1.

A harness-side terminal 35, which is a terminal portion of an external device, is securely fastened to the coupling seat 27 with a harness-side terminal mounting nut 36 screwed onto the harness-side terminal mounting male screw portion 28.

An opening portion 3a is provided to the rear bracket 3 located on the outer side of the rectifier 20 so as to be formed at a position corresponding to the rectifier 20 in the radial direction of the shaft 6. The output terminal 26, which is integral with the cylindrical body 30, the heat sink 31, and the resin body 32, projects outward in the radial direction of the shaft 6 through the opening portion 3a from the inside of the rear bracket 3.

The terminal portion 32a of the resin body 32, which projects in the radial direction of the shaft 6, includes a pair of cutout portions 32d formed on a circumference so that the cutout portions 32d are opposed to each other, as illustrated in FIG. 3. The harness-side terminal 35 can be inserted through any one of the cutout portions 32d. Moreover, at the time of fastening with the nut 36, the cutout portions 32d have a function of retaining the harness-side terminal 35. As a result, the fastening is facilitated.

In the thus constructed AC generator 1 for a vehicle, a current is supplied from a battery (not shown) through the brushes 16 and the slip rings 15 to the field windings 9 to generate the magnetic fluxes.

By the magnetic fluxes, magnetic poles of one of the pole cores 10 are magnetized to the N-pole, whereas magnetic poles of another pole core 10 are magnetized to the S-pole.

On the other hand, a rotating torque of an engine is transmitted through an intermediation of a belt (not shown) and the pulley 7 to the shaft 6 to rotate the rotor 8. As a result, a rotating magnetic field is applied to the stator windings 14 to generate the electromotive force in the stator windings 14. The AC electromotive force is rectified into a direct current through the rectifier 20, while a magnitude of the DC voltage is regulated by the voltage regulator 19. Then, an output of the rectifier 20 passes through the relay terminal bolt 25, the output terminal 26, and the harness-side terminal 35 to charge the battery.

According to the AC generator 1 for a vehicle of the first embodiment of the present invention, an output current of about 200 A at a maximum flows through the output terminal 26. Heat generation by the energization with the current flow is transmitted to the base portion 30b and the extended portion 30c through the joint portion 30a of the cylindrical body 30 so as to be radiated from the cooling fins 31a of the heat sink 31.

In this manner, a temperature rise of the output terminal 26 and the resin body 32 can be suppressed. As a result, a temperature rise of the relay terminal bolt 25 and the positive-pole side heat sink 21 is also suppressed. Thus, a temperature rise of the diodes mounted to the positive-pole side heat sink 21 is also suppressed. Accordingly, thermal deterioration is prevented, and durability is improved.

Further, an increase in temperature of the resin body 32 can also be suppressed. Therefore, thermal deterioration and thermal contraction of the resin body 32 can be prevented, and a force applied by the nut 36 for fastening the harness-side terminal 35 to the output terminal 26 can be prevented from being lowered.

Further, the output terminal 26, the cylindrical body 30, the heat sink 31, and the resin body 32 are constructed as the single component. Thus, the number of components is reduced. Moreover, excellent ease of assembly is obtained.

When a space between the joint portion 30a of the cylindrical body 30 and the output terminal 26 is filled with a silicon resin having high thermal conductivity, heat radiating performance of the output terminal 26 is further improved. As a result, the temperature rise of the output terminal 26 and the resin body 32 can be further suppressed.

Alternatively, when the space between the joint portion 30a of the cylindrical body 30 and the output terminal 26 is filled with an adhesive having high thermal conductivity in place of the silicon resin, joint strength between the output terminal 26 and the cylindrical body 30 can be improved in addition to the improvement of the heat radiating performance of the output terminal 26.

Further alternatively, the space may be filled with a silicon resin mixed with an adhesive.

The heat sink 31 made of aluminum may be formed by extrusion.

Moreover, the heat sink 31 may also be formed by die-cast molding because the plurality of cooling fins 31a are formed.

Although the cylindrical body 30 made of the ceramic has been described by way of example, any material having electrical insulating property and high thermal conductivity may be used.

Further, although the heat sink 31 made of aluminum has been described by way of example, other materials having high thermal conductivity, such as copper, may also be used.

Further, the heat sink 31 provided with the cooling fins 31a has been described by way of example. However, when the heat sink 31 itself is formed into, for example, a lattice pattern or a net-like pattern to be exposed externally, the heat radiating performance can be ensured even without the cooling fins 31a.

Second Embodiment

Figure 4:
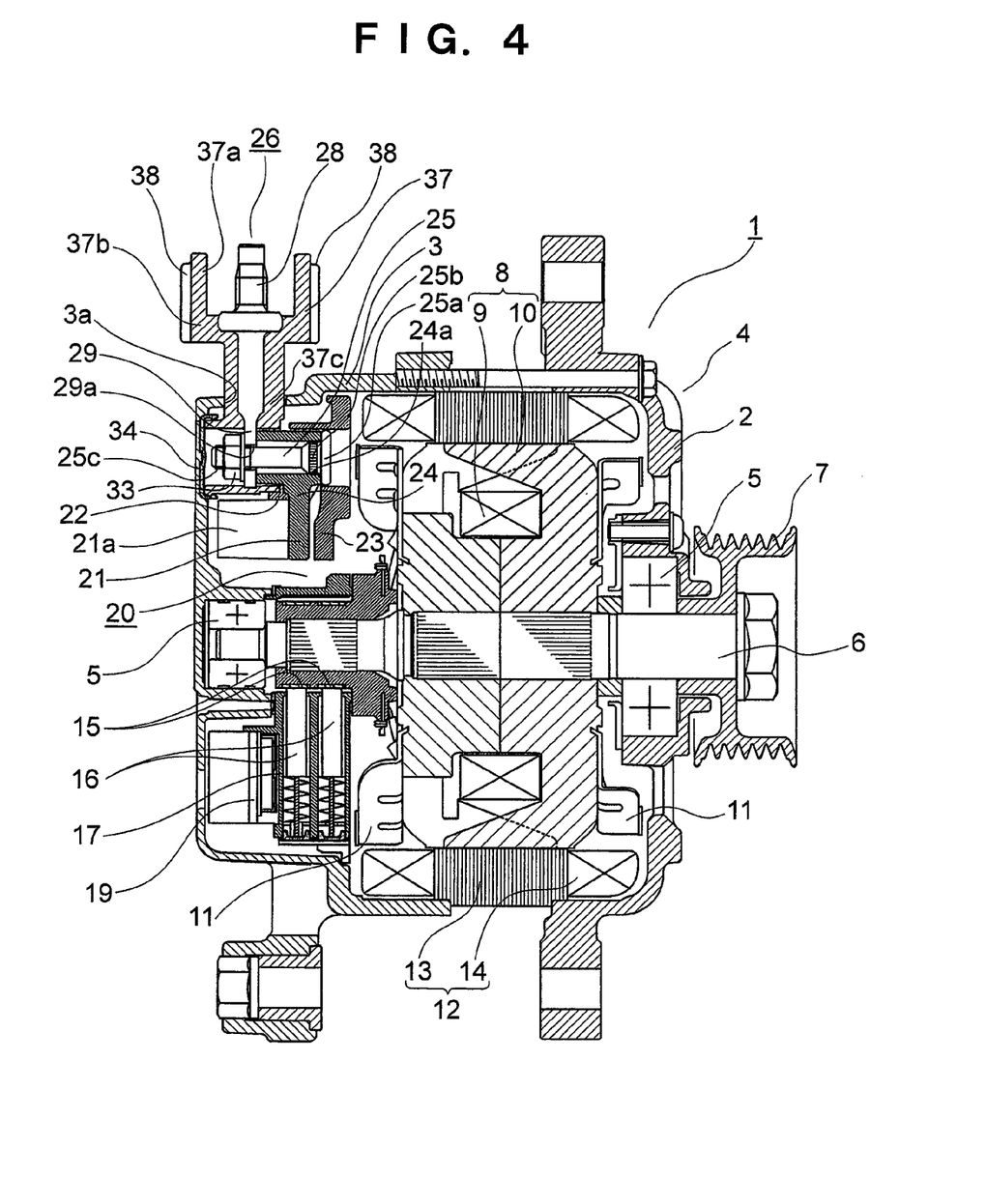
FIG. 4 is a vertical sectional view illustrating an AC generator for a vehicle according to a second embodiment of the present invention.
Figure 5:
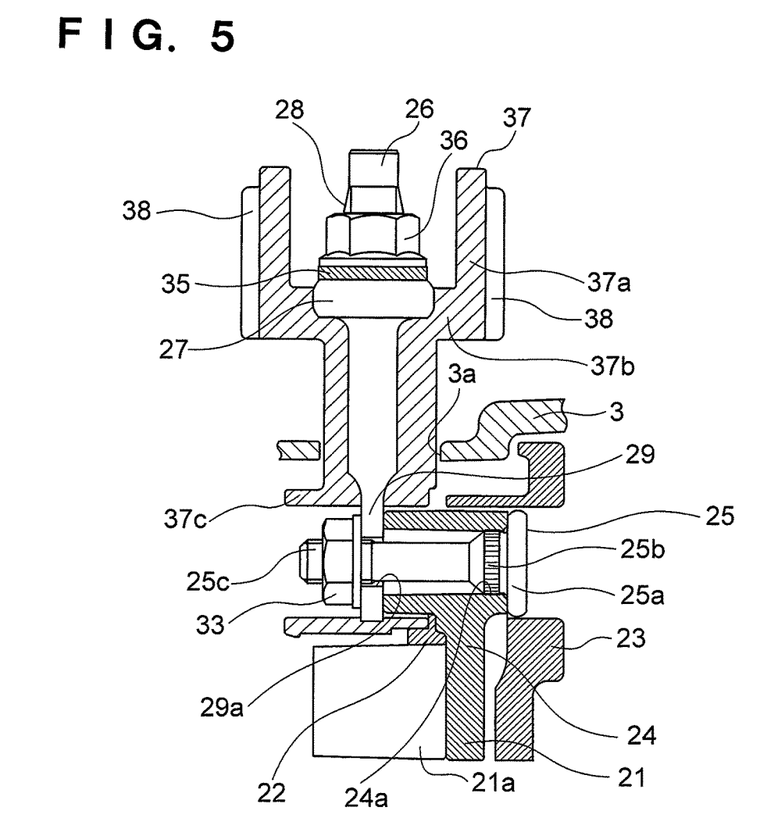
FIG. 5 is an enlarged sectional view of a main part of FIG. 4.
Figure 6:
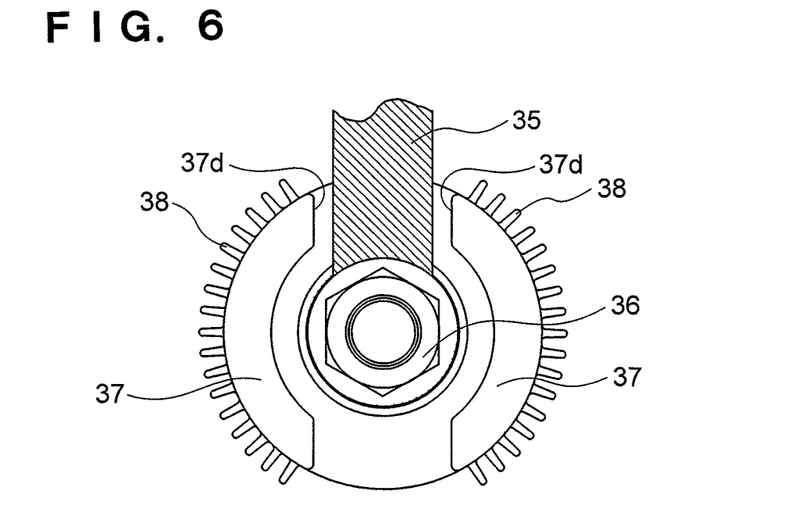
FIG. 6 is a plan view of FIG. 5.

FIG. 4 is a vertical sectional view illustrating an AC generator 1 for a vehicle according to a second embodiment of the present invention, FIG. 5 is a view of a main part of FIG. 4, and FIG. 6 is a plan view of FIG. 5.

In the second embodiment, a resin body 37 is made of a thermoplastic resin mixed with an inorganic filler having high thermal conductivity. The resin body 37 is formed integrally with the output terminal 26 by insert molding.

The resin body 37 includes a terminal portion 37a, a base portion 37b, and a mounting portion 37c. The terminal portion 37a is separated away from the output terminal 26. The base portion 37b is integral with the coupling seat 27. The mounting portion 37c is integral with an end portion of the output terminal 26, which is located on the relay terminal bolt 25 side.

The terminal portion 37a, which is located outside the rear bracket 3 in the radial direction of the shaft 6, has a pair of cutout portions 37d formed on a circumference so that the cutout portions 37d are opposed to each other, as illustrated in FIG. 6. A plurality of (for example, thirty-four) cooling fins 38 are formed on a circumference of an outer circumferential portion of the resin body 37 so as to be integral therewith.

In the second embodiment, the thermoplastic resin used for the resin body 37 is a PPS resin as in the case of the resin body 32 of the first embodiment. The filler is a metal such as alumina.

The remaining configuration is the same as that of the AC generator 1 for a vehicle according to the first embodiment.

According to the AC generator 1 for a vehicle of the second embodiment, the resin body 37 formed integrally with the output terminal 26 is made of the material having the electrical insulating property and the high thermal conductivity. In addition, the plurality of cooling fins 38 are provided on the outer circumferential portion of the resin body 37. Therefore, heat generated from the output terminal 26 is radiated externally through the resin body 37.

In this manner, a temperature rise of the output terminal 26 and the resin body 37 can be suppressed. As a result, a temperature rise of the relay terminal bolt 25 and the positive-pole side heat sink 21 is also suppressed. Thus, a temperature rise of the diodes mounted to the positive-pole side heat sink 21 is also suppressed. Accordingly, thermal deterioration of the diodes is prevented, and durability is improved.

Further, an increase in temperature of the resin body 37 can also be suppressed. Therefore, thermal deterioration and thermal contraction of the resin body 37 can be prevented, and a force applied by the nut 36 for fastening the harness-side terminal 35 to the output terminal 26 can be prevented from being lowered.

Further, the output terminal 26 is formed integrally with the resin body 37 by the insert molding. In addition, the cylindrical body 30 and the heat sink 31 of the first embodiment are omitted. Therefore, the manufacturing is further facilitated.

In the second embodiment described above, the cooling fins 38 are provided on the outer circumferential portion of the resin body 37. Depending on the kind of filler having high thermal conductivity to be mixed in the thermoplastic resin, however, sufficiently high heat radiating performance can be ensured even without the cooling fins 38.

Moreover, by using the resin body 37 of the second embodiment in place of the resin body 32 of the first embodiment, the temperature rise of the output terminal 26 of the first embodiment can be further suppressed.

Although the output terminal 26 projects outward in the radial direction of the shaft 6 from the opening portion 3a of the rear bracket 3 in the first and second embodiments, the output terminal 26 may project from the rear bracket 3 in the axial direction of the shaft 6.

Moreover, an output-terminal bolt having a hexagonal head portion may be used for the output terminal 26.

Further, the present invention is applied to the terminal device of the AC generator 1 for a vehicle, which is a rotating electric machine, in the first and second embodiments described above. However, as a matter of course, the present invention is not limited thereto, but may also be applicable to, for example, a motor generator serving both as a starter motor and as an AC generator.

Further, the casing including the front bracket 2 and the rear bracket 3 has been described by way of example in each of the embodiments described above. However, casing may also be a resin case mounted to the rear bracket 3.

In this case, the voltage regulator 19 and the rectifier 20 are provided outside the rear bracket 3. The resin case is mounted to the rear bracket 3 so as to surround the voltage regulator 19 and the rectifier 20.

Further, the mounting portion 29 of the terminal device is connected to the positive-pole side heat sink 21 of the rectifier 20, whereas the output terminal 26 of the terminal device projects outward through an opening portion of the resin case so as to be connected to the terminal of the external device by fastening.

What is claimed is:
1. A rotating electric machine, comprising:
a casing having an opening portion;
an internal device provided inside the casing; and
a terminal device provided so as to project outward from inside of the casing through the opening portion, the terminal device being configured to electrically connect the internal device and an external device provided outside the casing,
wherein the terminal device comprises:
an output terminal comprising an output terminal bolt projecting outward through the opening portion to be connected to a terminal portion of the external device by fastening; and
a resin body having electrical insulating property and thermal conductivity, for integrally covering the output terminal except at least for a portion to be connected to the terminal portion,
wherein the resin body comprises:
a mounting portion joined directly to an outer circumferential portion of a first part of the output terminal bolt, the first part being connected to the internal device, and
a terminal portion spaced apart from an outer circumferential portion of a second part of the output terminal bolt, the second part being connected to the external device.
2. A rotating electric machine according to claim 1, wherein the resin body comprises a plurality of fins formed integrally on an outer circumferential portion of the resin body.
3. A rotating electric machine, comprising:
a casing having an opening portion;
an internal device provided inside the casing; and
a terminal device provided so as to project outward from inside of the casing through the opening portion, the terminal device being configured to electrically connect the internal device and an external device provided outside the casing,
wherein the terminal device comprises:
an output terminal projecting outward through the opening portion to be connected to a terminal portion of the external device by fastening;

a cylindrical body having electrical insulating property and thermal conductivity, the cylindrical body comprising:
   a joint portion joined to an outer circumferential portion of a part of the output terminal, the part being connected to the internal device;
   a base portion extending from the joint portion in a radial direction of the cylindrical body; and
   an extended portion having a larger diameter than a diameter of the joint portion and extending from the base portion in an axial direction of the cylindrical body so as to surround the output terminal;
a heat sink jointed to an outer circumferential portion of the extended portion of the cylindrical body; and
a resin body having electrical insulating property and thermal conductivity, the resin body being provided so as to surround the output terminal, the resin body integrating the output terminal, the cylindrical body, and the heat sink with each other.

4. A rotating electric machine according to claim 3, wherein the cylindrical body is made of a ceramic.

5. A rotating electric machine according to claim 3, further comprising silicon provided between the output terminal and the joint portion of the cylindrical body.

6. A rotating electric machine according to claim 3, further comprising an adhesive provided between the output terminal and the joint portion of the cylindrical body.

7. A rotating electric machine according to claim 3, further comprising a cooling fin provided on an outer side of the heat sink.

8. A rotating electric machine according to claim 7, wherein the cooling fin comprises a plurality of cooling fins provided at intervals along a circumferential direction of the heat sink.

9. A rotating electric machine according to claim 3, wherein the heat sink is made of aluminum.

10. A rotating electric machine according to claim 1, wherein the resin body is made of a thermoplastic resin mixed with an inorganic filler having thermal conductivity.

11. A rotating electric machine according to claim 1, wherein the internal device comprises a rectifier for rectifying an alternate current into a direct current.

12. A rotating electric machine according to claim 1, wherein the rotating electric machine comprises an AC generator for a vehicle.

* * * * *